Aug. 23, 1927.
G. E. JONSSON
1,639,803
NUT LOCK
Filed Feb. 1, 1926
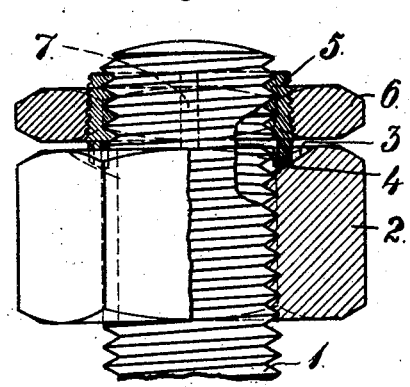
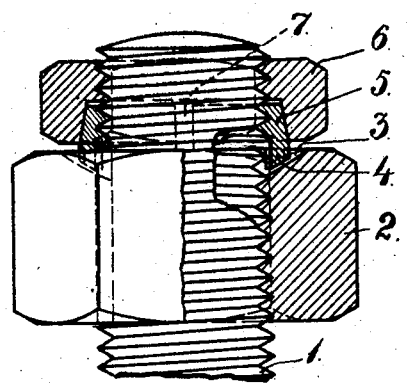
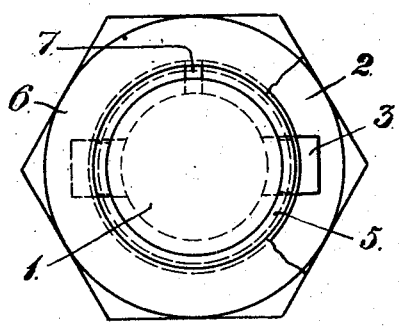
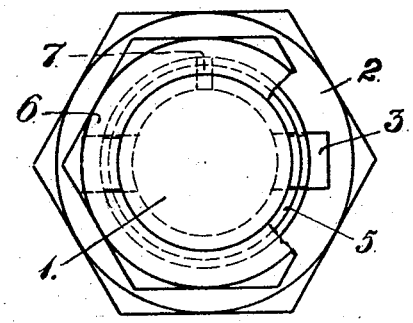
Inventor,
Gustaf Emil Jonsson
By Brown, Boettcher, Dienner.
Attys.

Patented Aug. 23, 1927.

1,639,803

UNITED STATES PATENT OFFICE.

GUSTAF EMIL JONSSON, OF HALMSTAD, SWEDEN.

NUT LOCK.

Application filed February 1, 1926, Serial No. 85,293, and in Sweden February 4, 1925.

This invention relates to certain new and useful improvements in nut-locks and has for its object to provide a simple means for locking the nut on its bolt and prevent it from shaking loose.

It has been proposed in this type of nut-locks to use a split ring with a conical or tapering outer surface as the locking member. This invention consists in certain novel features of construction of said ring which is hereinafter described.

In the drawing Fig. 1 is a side view of a bolt end with nut and nut-lock, partly in section, Fig. 2 a top view of same, Fig. 3 a side view of another embodiment of the invention, partly in section, and Fig. 4 a top view of same.

1 is the bolt, 2 is the work holding nut provided with two diametrically opposite recesses 3 for engagement with projections 4 on a ring 5 split at 7, which is screwed on the bolt and has its outside conical surface adapted for engagement with a similarly shaped inner surface of a locking or jamming ring 6.

When the work nut 2 is screwed on the bolt 1 the ring 5 is simultaneously applied. After having screwed the work nut home the locking nut 6 is applied on the ring 5 to lock it in position.

In the embodiment according to Figs. 1 and 2 the ring 5 is threaded on its outside and the locking nut 6 provided with a correspondingly threaded inner surface. When screwing the nut 6 on the split ring 5 this latter one will be contracted and jammed hard against the bolt and thereby lock the work nut which is prevented from turning on account of the projections 4 and the recesses 3.

In the embodiment according to Figs. 3 and 4 the ring 5 is provided with a conical smooth outside surface and the locking nut with parts of its inside surface shaped with a corresponding conical surface and the rest with threads for engagements with the threads of the bolt. When screwed on the bolt the locking nut will jam the split ring 5 by means of its conical surface and thereby lock the work nut 2.

As will be clearly understood the work holding nut 2 is applied as usual for a common nut and screwed home as usual, the only difference being that the split ring 5 is brought along although without performing any action as yet. In this position the locking nut 6 is applied and the split ring is prevented from turning on account of the projections and recesses. During the tightening of the locking nut 6 and jamming of the split ring this latter one is thus prevented from sliding on the threads of the bolt and thereby does not damage said threads. No special tool is necessary the only one to be used being a common screw-wrench of standard size.

It will be observed that other embodiments can be designed without departing from the spirit of my invention. Thus the number and position of projections and recesses can be different; for instance only one projection and one recess can be used. Or the width of the recesses and projections can be made larger than shown so that only a narrow boss is left in the nut on either side between the recesses and only a narrow space is left between the projections in the ring 5. This latter design will simplify the manufacture of the ring 5, which can be made from a piece of steel pipe.

What I claim is:—

1. In a work holding nut with a nut-lock, recesses in the upper flat end of said work nut, a split ring with inside threads of the same size and pitch as those of said work nut and with outside threads on a substantially conical surface co-acting with a locking nut with corresponding threads, the split ring being provided with projections co-acting with said recess in said work nut.

2. The combination with a threaded bolt and a work nut, of a split sleeve threaded on its interior to fit the bolt and having its outer surface slightly conical and threaded, said sleeve and nut having interlocking engagement, and a locking nut having a threaded opening which is conical to fit the outside of said sleeve, whereby said sleeve will be powerfully contracted to clamp the bolt when the lock nut is supplied.

In witness whereof, I hereunto subscribe my name this 11th day of January, 1926.

GUSTAF EMIL JONSSON.